United States Patent [19]

Van Hatten

[11] 4,366,480
[45] Dec. 28, 1982

[54] DEMAND DRIVEN ACCESS MECHANISM

[75] Inventor: David A. Van Hatten, New Brighton, Minn.

[73] Assignee: Control Data Corporation, Minneapolis, Minn.

[21] Appl. No.: 273,897

[22] Filed: Jun. 15, 1981

[51] Int. Cl.$^3$ ............................................... H04Q 3/00
[52] U.S. Cl. .................................. 340/825.51; 370/85
[58] Field of Search ......................... 340/825.5, 825.51; 370/91, 85

[56] References Cited

U.S. PATENT DOCUMENTS 4,189,766  2/1980  Horiguchi et al. ................ 340/825.5
4,227,179 10/1980  Perry ................................. 340/825.1

Primary Examiner—Donald J. Yusko
Attorney, Agent, or Firm—Robert M. Angus; Joseph A. Genovese

[57] ABSTRACT

A demand driven access mechanism comprises logic apparatus at each station capable of seizing use of a shared communication channel for enabling access to a selected one station. The logic apparatus receives status signals from all stations so that if one station seeks access to the channel it will be enabled immediately upon an inactive status to the channel. If two or more stations simultaneously seek access to the channel, the logic apparatus establishes a priority order between them, thereby enabling access to only one station at a time. The priority ordering is based, in part, by the identity of the station last enabled, to thereby assure priority order allocation among the stations.

12 Claims, 5 Drawing Figures

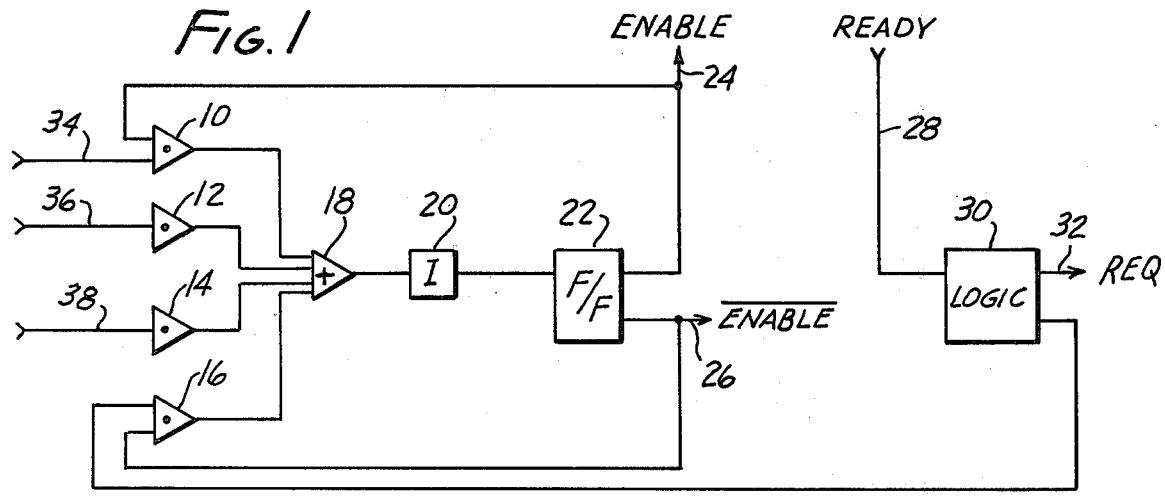
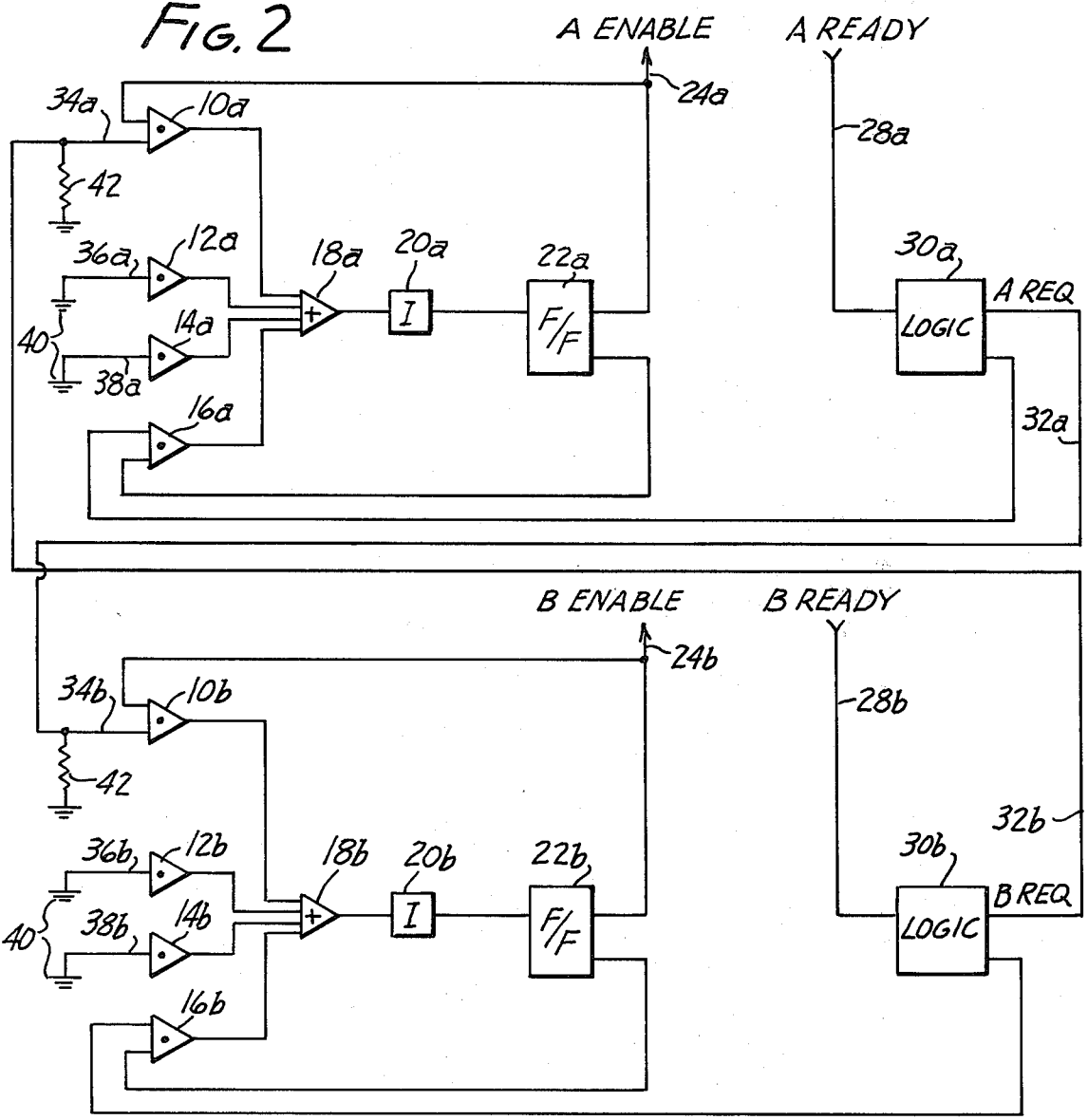

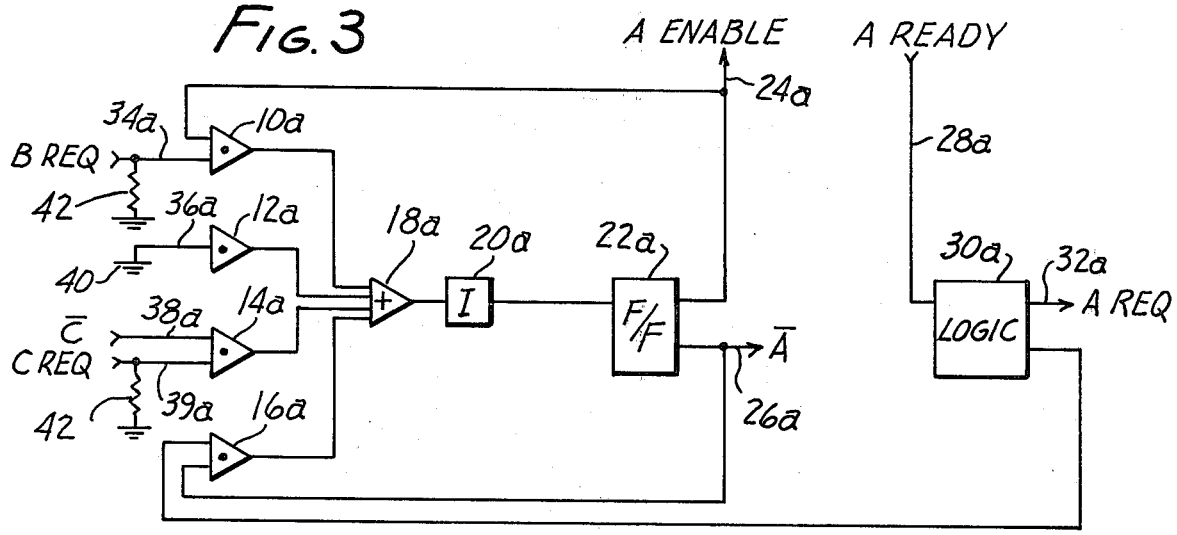
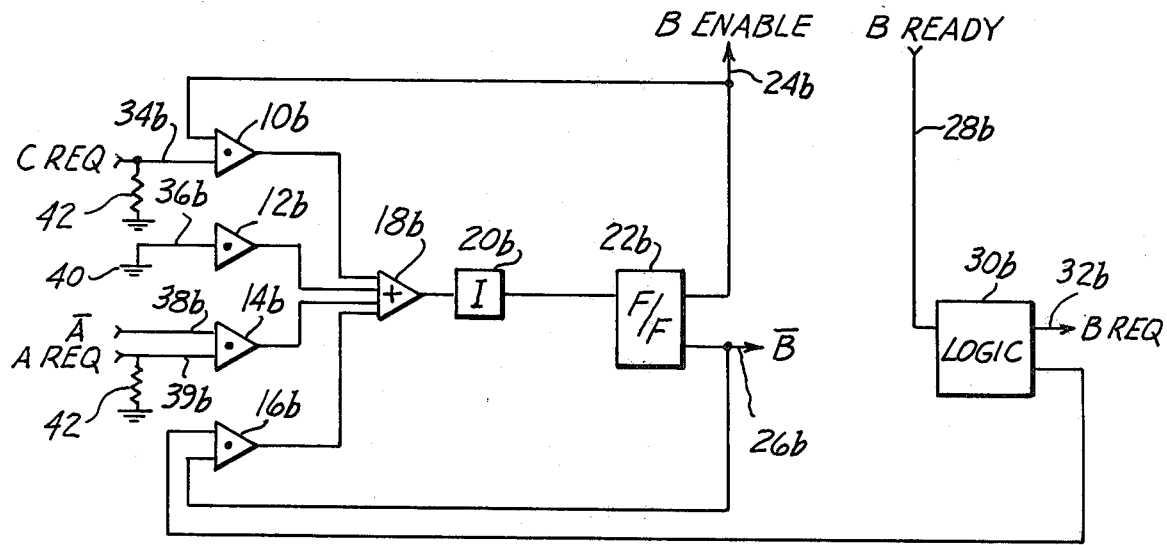
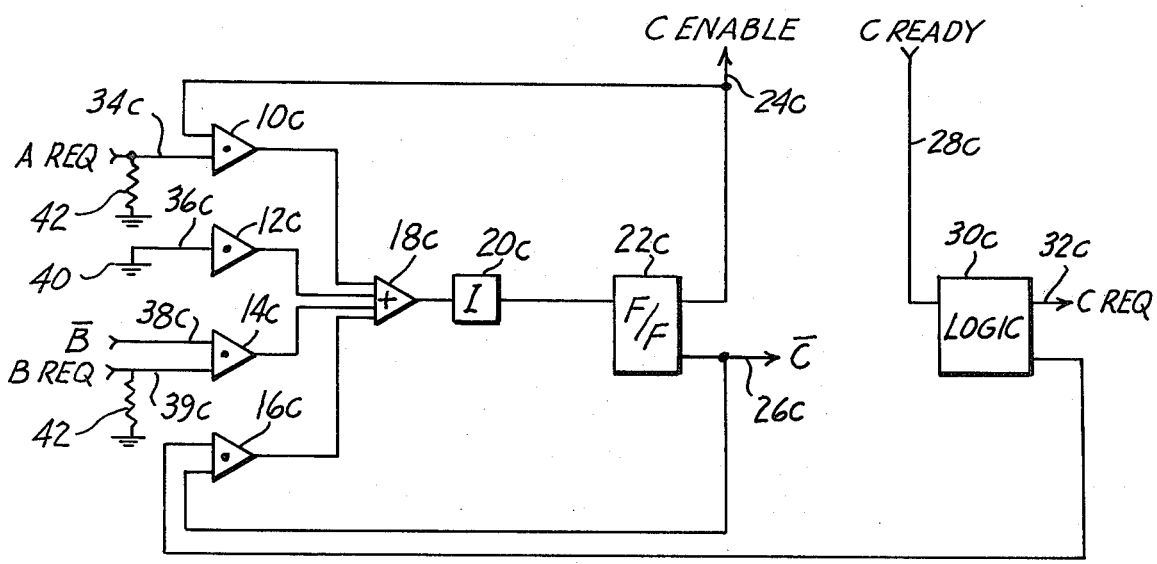

Fig. 4A
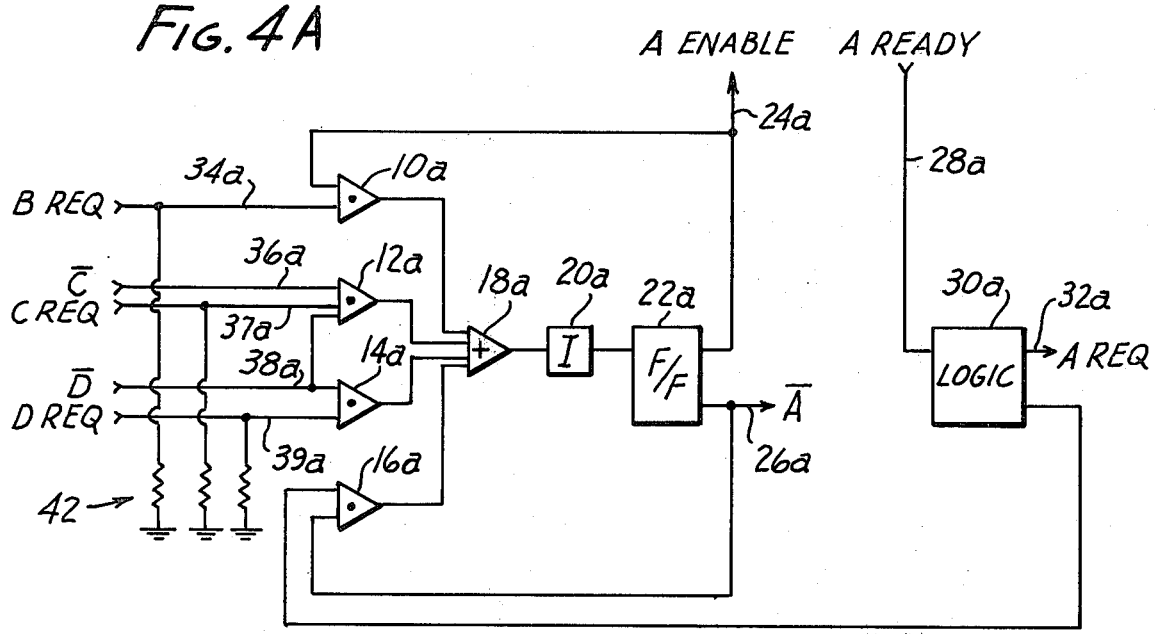
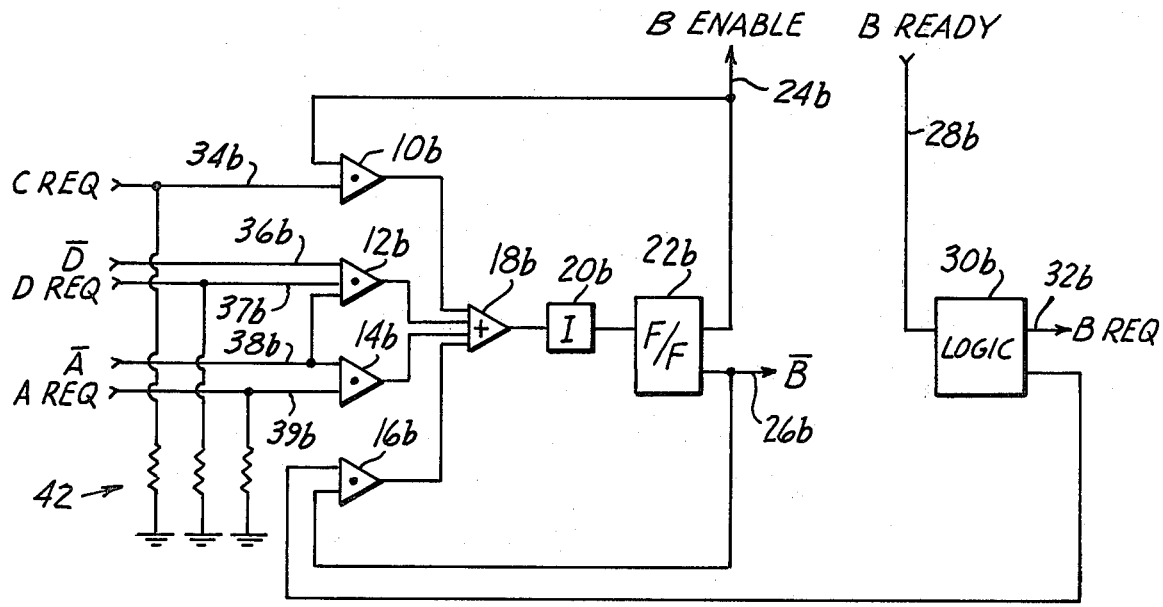

FIG. 4B
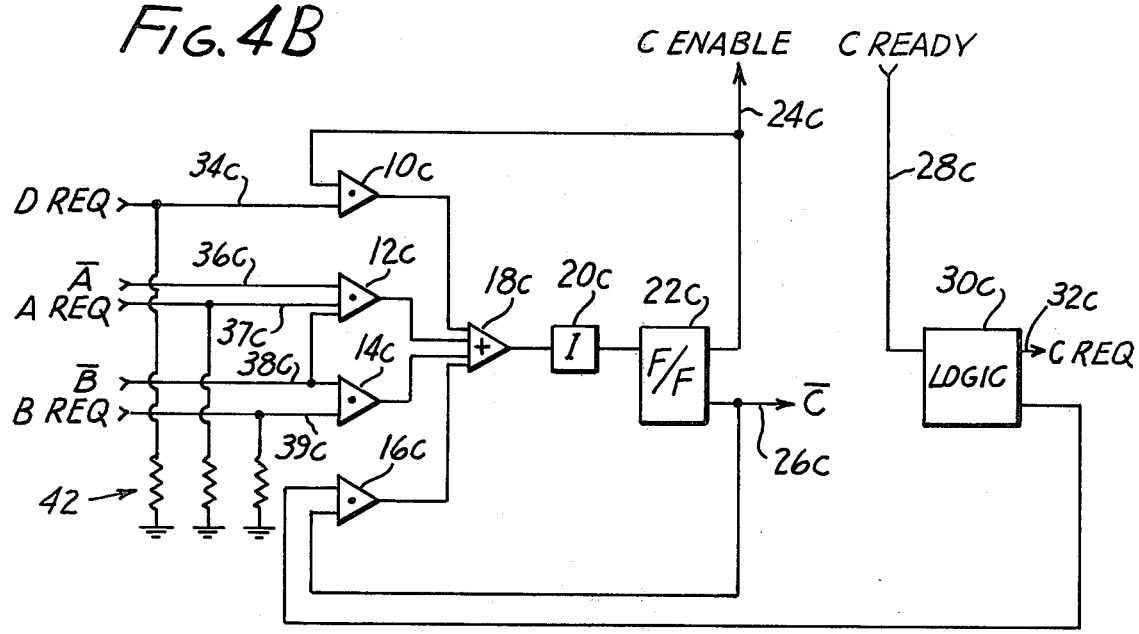
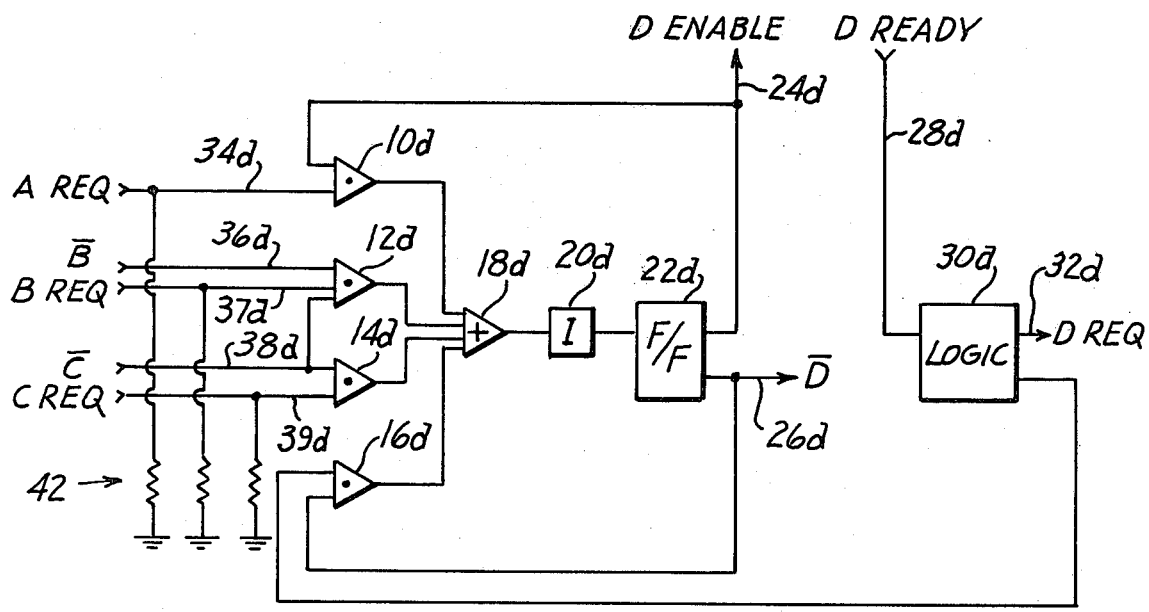

DEMAND DRIVEN ACCESS MECHANISM

This invention relates to a demand driven access mechanism for ordering priority between several contending units seeking use of a channel.

As used herein, the term "communications channel" concerns a data bus for providing shared communications among a plurality of stations. Typically, the stations comprise components of a data processing system, such as processors, device controllers, etc.

Shared communications is ordinarily accomplished by either of two basic techniques: time division and contention.

Time division systems contemplate the assigning of specific time slots to each station during which time the communication channel is dedicated to that station. Some systems require the station to which the time slot is assigned to complete communications during its time slot, whereas other systems merely require the station to initiate communications during its time slot, thereby capturing the communication channel for its own use. One problem with time division systems resides in the fact that the communications system is dormant during the periods that a time slot is encountered for a station which is not ready to initiate communications. Another problem with time division systems resides in the fact that if a station is ready to initiate communications, it must wait until its assigned time slot before communications can be initiated. For example, in a system with four stations, a given station ready to initiate communications may be required to wait as many as three time slots before it can initiate communications; this being without regard to whether the other stations are ready to initiate communications.

In a pure contention system, a station will transmit onto the channel whenever it has a message to be sent. One problem with pure contention systems is the fact that if two or more stations are ready to transmit at the same time, their messages will be overlapped and hence, garbled. To overcome the problems of pure contention systems it has been common to provide a lock-out of all other stations while the channel is active, usually accomplished by a "channel active" status imposed on the channel by the transmitting station. However, if two or more stations are ready to transmit on an inactive channel, these stations might simultaneously seize use of the channel upon a channel inactive status, thereby resulting in a garbling of the messages and the necessity for retransmission. Refinements to the contention channel systems include such techniques as "priority ordering" which provides a different time delay for each successive station upon initiation of a channel inactive status to thereby reduce the likelihood that two or more stations will attempt to seize use of the channel at the same time.

Contention channels involving a high amount of communications traffic have not been altogether successful in spite of the employment of lock-out and priority ordering techniques. Particularly, where there is a high amount of channel activity, those stations having lower ordered priority are often denied access to the channel by stations with higher priorities. One technique for overcoming some of the problems of contention channels is described in U.S. Pat. No. 4,232,294 granted Nov. 4, 1980 to R. G. Burke and R. F. Martin for a "Method and Apparatus for Rotating Priorities Between Stations Sharing a Communication Channel."

This patent describes a contention channel wherein priority order is based upon the station last having use of the channel. Thus, with the Burke and Martin technique, it is possible to alter the priority order of the stations based upon which station had use of the channel last. See also U.S. Pat. No. 4,199,661 granted Apr. 22, 1980 to P. E. White and E. G. Blumke for "Method and Apparatus for Eliminating Conflicts on a Communication Channel" for certain improvements to time division systems.

One problem common to time division and contention systems resides in the fact that a delay is required before a given station can seize use of the channel without interference from another station. Thus, in time division systems, delays occur by virtue of allocating time slots to stations not ready to seize use of the channel. In contention systems employing techniques for minimizing or even eliminating conflicts, delays are inherent to assure an ordered priority of the contending stations. While many improvements have been directed at minimizing the delays associated with gaining access to the channel, thereby increasing the availability of the channel for communication activity, prior techniques have not been successful at eliminating delays altogether.

The present invention concerns a demand driven access mechanism for a plurality of active stations capable of seizing use of a channel in which any station can immediately seize use of the channel upon a channel inactive status. If two or more stations attempt to seize use of the channel at a given moment, a priority order is established as between the stations seeking use of the channel to allocate use to the higher ordered station.

It is an object of the present invention to provide a demand driven access mechanism for granting access to each of a plurality of stations seeking use of a channel upon a channel inactive status.

It is another object of the present invention to provide a demand driven access mechanism for granting access to each of a plurality of stations seeking use of a channel wherein a priority ordering of the stations seeking use of the channel is established if two or more stations are seeking simultaneous use of the channel.

It is another object of the present invention to provide a demand driven access mechanism employing logic circuitry at each station seeking use of the channel to permit access of any station upon an inactive status of the channel, yet ordering priority between such stations if two or more stations seek simultaneous use of the channel.

It is yet another object of the present invention to provide a demand driven access system in accordance with the previous objectives employing a simple but uniform logic circuit at each station to permit expansion of the system to accommodate any of a reasonable number of stations for the system.

In accordance with the present invention, a logic circuit is provided at each station seeking use of the channel. The logic circuit receives, as inputs, status signals from each of the stations relating to which station has access to the channel and which stations request access to the channel. If a station seeks access to the channel when the channel becomes inactive, the logic circuitry of the station seeking use of the channel will enable that station to seize immediate use of the channel. However, if two or more stations are simultaneously seeking access to the channel, the logic circuitry of the individual stations orders priority amongst the stations seeking use of the channel, thereby giving access to only one such station.

One feature of the present invention resides in the fact that the priority ordering amongst the stations seeking use of the channel is at least in part dependent upon which station had use of the channel last.

Another feature of the present invention resides on the fact that since priority ordering is based on which station had previous use of the channel, the ordering is effectively allocated amongst the several stations.

The above and other features of this invention will be more fully understood from the following detailed description and the accompanying drawings, in which:

FIG. 1 is a block circuit diagram of a basic logic circuit for each station of a system in accordance with the presently preferred embodiment of the present invention;

FIG. 2 is a block circuit diagram of the logic circuitry in accordance with the presently preferred embodiment of the present invention for a system employing two stations;

FIG. 3 is a block circuit diagram of the logic circuitry in accordance with the presently preferred embodiment of the present invention for a system employing three stations; and FIGS. 4A and 4B, taken together, illustrate block circuit diagram of the logic circuitry in accordance with the presently preferred embodiment of the present invention for system employing four stations.

With reference to FIG. 1, there is illustrated a block circuit diagram of a logic circuit in accordance with the presently preferred embodiment of the present invention, the logic circuit illustrated in FIG. 1 being employed in each station of a system employing the demand driven access mechanism in accordance with the present invention. The logic circuit includes a plurality of AND gates 10, 12, 14 and 16, each providing an input to OR gate 18. The output of OR gate 18 is provided through inverter 20 to the "set" input of flip-flop 22. The "set" output of flip-flop 22 is provided to one input of AND gate 10 and via lead 24 to the Enable input of the respective station. The "reset" output of flip-flop 22 is provided to one input of AND gate 16 and to an Enable lead 26. Line 28 from the respective station provides a "Station Ready" signal to logic circuit 30 which in turn provides a "Request" signal on line 32 or a "Not Request" signal as a second input to AND gate 16.

As shown in FIG. 1, AND gates 10, 12 and 14 each have respective external inputs 34, 36 and 38. As will be more fully understood hereinafter, input line 34 is connected to line 32 of one other logic circuit when two or more units are involved in the system, and lines 36 and 38 represent multiple inputs to the respective AND gates 12 and 14. Also as will be more fully understood hereinafter, input lines 34, 36 and 38 may be grounded when other units are not involved in this system.

FIGS. 2, 3 and 4 illustrate the interconnection of logic circuits for two, three and four stations, respectively, in accordance with the present invention. For purposes of consistency, the stations are identified as stations A, B, C and D, and the elements of the basic logic circuit bear identical reference numerals to that illustrated in FIG. 1, followed by the letter a, b, c, d, respectively, for each logic circuit module.

With reference particularly to FIG. 2, stations A and B are arranged to contend for use of a communication channel. As shown in FIG. 2, line 32a carrying the A Request signal from logic circuit 30a is connected to input 34b of AND gate 10b. Similarly, lead 32b carrying the B Request signal from logic circuit 30b is connected to input 34a of AND gate 10a. Since only two stations are illustrated in the system of FIG. 2, the inputs for AND gates 12a, 12b, 14a and 14b are connected direclty to ground at 40.

From an inspection of the logic circuitry, it will be seen that a particular station is enabled by its respective flip-flop 22 only when a high signal is provided by its inverter circuit 20. The inverter circuit 20 is high only if a low output from OR gate 18 occurs, a condition which will occur only if none of the AND gates 10, 12, 14 and 16 pass a high signal. Thus, for a station to become enabled, and thereby gain access to the channel, all of its respective AND gates 10, 12, 14 and 16 must be in a "low" condition.

In the case of the system illustrated in FIG. 2, AND gates 12 and 14 of both logic circuits have their inputs grounded at 40, thereby satisfying the low output condition for those AND gates. Therefore, only the station whose other two AND gates 10 and 16 are also in a low condition will be enabled. With reference to FIG. 2, let it be assumed that flip-flop 22a has been set so that station A has been enabled for access to use the channel, and let it be assumed further that station A is actually using the channel. Since station A is using the channel, a signal via line 28a is imposed on logic circuit 30a by the station causing the logic 30a to impose a signal on line 32a which is received at input 34b of AND gate 10b. Also, let it be assumed that station B is not presently ready to seize use of the channel so that its logic 30b imposes a signal on its AND gate 16b. Since station B is neither enabled nor ready to send a signal, the conditions for AND gate 16b are such as to operate AND gate 16b to thereby assure that flip-flop 22b will not set.

If station B subsequently becomes ready to seize use of the channel a signal is imposed on logic circuit 30b to remove the high signal to one input of the AND gate 16b. Seemingly, this would remove the condition of one of the AND gates being operated which would seemingly cause a setting of flip-flop 22b. However, upon a set of flip-flop 22b, a signal is imposed on a second input of AND gate 10b (whose other input is already high due to the operation of logic circuit 30a) thereby causing a resetting of the flip-flop 22b. Consequently, flip-flop 22b will never remain stable in a set condition so long as station A has use of the channel. Meanwhile, logic circuit 30b has imposed a signal indicative of a B Request onto input 34a of AND gate 10a to reset flip-flop 22a associated with station A. Therefore, under these conditions, namely that station A is using in the channel and station B requests use of the channel, an enable signal is not presented via line 24 to either station, although station A continues to use the channel until it completes use.

Once station A has ceased use of the channel, a signal to that effect is provided via line 28a to logic circuit 30a to remove the A Request signal from line 32a and to impose a Not Request signal to AND gate 16a. Since flip-flop 22a is in a reset condition, AND gate 16a is operated to assure the reset of flip-flop 22a and to hold it there until A is ready to transmit again. Meanwhile, since B is ready to transmit, the B Request signal on line 32b is inputted to AND gate 10a via input 34a to assure nonsetting of flip-flop 22a, and at the same time, since none of the AND gates associated with station B are operated, flip-flop 22b is operated to enable station B.

Assume, at some later time, station B ceases use of the channel before station A is ready to commence use of the channel. Under such conditions, station B remains enabled via line 24b but no B Request signal is imposed on AND gate 10a via line 32b. Consequently, when the next station is ready to transmit a signal, whether it is station A or station B, that station is accorded use of the channel. In this respect, if it is station B who next requests use of the channel, it is already enabled and may seize the channel and lock out station A as heretofore described. Whereas if it is station A that is ready to use the channel, an A Request signal via line 32a operates AND gate 10b to reset flip-flop 22b to disable station B. If both stations A and B happen by, coincidence, to be ready to use the channel at the same instant (a highly unlikely circumstance), station B, which was already enabled, will seize use of the channel and lock out station A until the channel becomes idle.

FIG. 3 is an expansion of the system illustrated in FIG. 2 wherein three stations are employed. The only principal difference between the system illustrated in the FIG. 3 and that illustrated in FIG. 2 is that each of the AND gates 14 are connected to receive inputs from one of the other stations. Thus, AND gate 14a receives inputs via lines 38a and 39a from $\overline{C}$ and C Request; AND gate 14b receives inputs via lines 38b and 39b from $\overline{A}$ and A Request; and AND gate 14c receives inputs via lines 38c and 39c from $\overline{B}$ and B Request.

Similarly, FIG. 4 illustrates the system for four stations and differs from FIG. 3 by the inclusion of inputs for AND gates 12. Thus, AND gate 12a receives inputs from $\overline{C}$, C Request, and $\overline{D}$; AND gate 12b receives inputs from $\overline{D}$, D Request and $\overline{A}$; AND gate 12c receives inputs from $\overline{A}$, A Request and $\overline{B}$; and AND gate 12d receives inputs from $\overline{B}$, B Request and $\overline{C}$. Also, AND gate 14a receives inputs from $\overline{D}$ and D Request; AND gate 14b receives inputs from $\overline{A}$ and A Request; AND gate 14c receives inputs from $\overline{B}$ and B Request; and AND gate 14d receives inputs from $\overline{C}$ and C Request.

A review of the logic circuits will indicate that a station is enabled if the station requests use of the line and is not enabled, or if the station is enabled and there is no other requests for use of the channel. While the logic of the two station system illustrated in FIG. 2 is quite evident, the simplicity of the rule for three or more stations may require further analysis. Stated another way for three stations, station A is not enabled if (1) station A is enabled and station B requests access (the condition of AND gate 10), or (2) if station A is not enabled and does not request access (the condition of AND gate 16), or (3) if either station A or station B is enabled and station C requests access (the condition of AND gate 14). It will be noted that the condition of either station A or B being enabled is denoted by the condition of station C not being enabled. Likewise, for four units as illustrated in FIG. 4, station A is not enabled if (1) station A is enabled and station B requests access (the condition of AND gate 10), or (2) if station A is not enabled and does not request access (the condition of AND gate 16), or (3) if station D requests access and one of the stations A, B and C is enabled (the condition of AND gate 14, note that the condition of A, B or C being enabled is met by the condition of station D not being enabled), or (4) if station C requests access and either station A or B is enabled (the condition of AND gate 12, note that the condition of either A or B being enabled is satisfied by the condition of both C and D not being enabled).

Note that where three or more stations are involved, the access to the communication channel is given immediately to one selected station. This condition exists regardless of the number of requests for access which may exist at a given moment. For example, if station A has use of the channel, upon a channel idle status another station may gain access to the channel. If two or more of the other stations are simultaneously requesting access to the channel the logic circuitry automatically gives preference to the next station (station B), followed by the next station (station C) and lastly station D. Similarly, if station B has use of the channel, upon channel idle status the order of priority is station C, D and then A.

One feature of the present invention resides in the fact that identical circuitry is used for each station. Obviously, a greater number of stations than four may be employed expanding the principles of the present invention. In this respect, additional and expanded AND gates as inputs to OR gate 18 may be employed. Consequently, the illustration of four units is by way of example, and not of limitation.

In addition, another feature of the present invention resides in the use of resistors 42 connected at the input of each of AND gates 10, 12 and 14, when used. The reason for these resistors is that even if a station is subsequently removed from the system, it is not necessary to return to all the other stations to modify the circuitry. Instead, when a station is removed from the system, the presence of the resistors at the inputs of the other stations associated with signals from the now removed station will pull that AND gate down so as not to give a false indication of the presence of that station or a false indication of a request from that station.

The present invention thus provides a simple, reliable and highly effective technique for a demand driven access mechanism for granting access to a channel to each of the plurality of stations. The mechanism is designed so that only one station is enabled at any time. During power-up conditions, several stations might be enabled, but as soon as one station seeks use of the channel, any conflict will be resolved and only one station will thereafter have access to the channel. Thus, there is no need for power-up or initialization circuitry for this system. Since no delay is incurred in the granting of access to a particular station, the system is highly effective and makes maximum use of the communication channel. Priority ordering amongst the stations is performed through the logic circuitry according to the present invention to prevent conflicts from occurring even on an instantaneous granting access mode.

This invention is not to be limited by the embodiments shown in the drawings and described in the description, which are given by way of example and not of limitation, but only in accordance to the scope of the appended claims.

What is claimed is:

1. A demand driven access mechanism for enabling a station to seize use of a communication channel shared with one or more other stations, said mechanism comprising: first logic means responsive to a signal from said station for producing a station request signal if the station is either ready to seize use of the channel or is using the channel and for producing a station not-request signal if the station is neither ready to seize use of the channel nor is using the channel; second logic means for producing either an enable signal to said station or a not-enable signal, said second logic means being responsive to the station's enable signal and a request signal from a second station or to the stations's not-request signal and the stations's not-enable signal to produce said enable signal whenever the station is enabled by its respective second logic means and no request signal is present from the second station's first logic means or whenever the station's second logic means is not producing said enable signal and the station is ready to seize use of the channel.

2. Apparatus according to claim 1 wherein said second logic means further includes priority ordering means responsive to the request signal and selected not-enable signals of other stations to selectively provide said enable signal when two or more request signals are present from other stations.

3. Apparatus according to claim 2 wherein there are at least three stations sharing said channel and said priority ordering means does not provide said enable signal whenever (a) the respective stations is not enabled and the second station requests use of the channel, or (b) the respective station is not enabled and does not request use of the channel, or (c) the third station requests use of the channel and either the respective or the second station is enabled.

4. Apparatus according to claim 3 wherein there are at least four stations sharing said channel and said priority ordering means additionally does not provide said enable signal whenever (d) the fourth station requests use of the channel and none of the other stations is enabled.

5. Apparatus according to either of claims 3 or 4 wherein said enable signal is produced whenever the conditions for not producing the enable signal are not present.

6. Apparatus according to claim 1 wherein there are at least three stations sharing said channel and wherein said second logic means is additionally responsive to the request signal and not-enable signal from a third station, said second logic means producing said not-enable signal whenever (a) the enable signal is provided to the respective station and a request signal is provided from the second station, or (b) the not-enable and not-request signals are provided by the respective station, or (c) the request and not-enable signals are provided from the third station.

7. Apparatus according to claim 6 wherein there are at least four stations sharing said channels and wherein said second logic means is additionally responsive to the request signal and not-enable signals from a fourth station, said second logic means additionally producing said not-enable signal whenever (d) the request and not-enable signals are provided from the fourth station and the not-enable signal is provided from the third station.

8. Apparatus according to either of claims 6 or 7 wherein said enable signal is produced whenever said not-enable signal is not produced.

9. In a communication system having a plurality of stations each capable of seizing use of a communications channel shared by said stations, the improvement comprising, at each station, a demand driven access mechanism for enabling the respective station to seize use of the channel, said mechanism comprising:

A. first logic means responsive to the respective station for producing a station request signal whenever the respective station is either ready to seize use of the channel or is using the channel, and for producing a station not-request signal whenever the respective station is neither ready to seize use of the channel nor using the channel;

B. second logic means for producing either an enable signal or a not-enable signal, said second logic means comprising
 (i) first AND gate means responsive to the respective station's enable signal and to a request signal from a second station to produce a first logic signal,
 (ii) second AND gate means responsive to the respective station's not-request and not-enable signal to produce a second logic signal,
 (iii) OR gate means responsive to either said first or second logic signals to produce a third logic signal;
 (iv) enable means responsive to said third logic signal to produce said not-enable signal and responsive to the absence of said third logic signal to produce said enable signal; and C. output means for providing said enable signal to the respective station.

10. Apparatus according to claim 9 wherein said second logic means further includes third AND gate means responsive to the request signal and not-enable signal from a third station to produce a fourth logic signal, said OR gate means being responsive to any of said first, second or fourth logic signals to produce said third logic signal.

11. Apparatus according to claim 10 wherein said second logic means further includes fourth AND gate means responsive to the request signal and not-enable signal from a fourth station and said not-enable signal from said third station to produce a fifth logic signal, said OR gate means being responsive to any of said first, second, fourth or fifth logic signals to produce said third logic signal.

12. Apparatus according to any one of claims 9 through 11 wherein said enable means comprises inverter means responsive to said third logic signal to invert it, and flip-flop means responsive to the inverted third logic signal to produce said enable signal and responsive to the absence of said inverted third logic signal to produce said not-enable signal.

* * * * *